United States Patent
Fukuda et al.

(10) Patent No.: US 12,410,827 B2
(45) Date of Patent: Sep. 9, 2025

(54) JOINT STRUCTURE, METHOD FOR DESIGNING JOINT STRUCTURE, AND METHOD FOR MANUFACTURING JOINT STRUCTURE

(71) Applicant: MAZDA MOTOR CORPORATION, Hiroshima (JP)

(72) Inventors: Naohiko Fukuda, Aki-gun (JP); Takahiro Kumagai, Aki-gun (JP); Koji Miyamoto, Aki-gun (JP); Hiroki Kimura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 403 days.

(21) Appl. No.: 18/051,336

(22) Filed: Oct. 31, 2022

(65) Prior Publication Data
US 2023/0160408 A1    May 25, 2023

(30) Foreign Application Priority Data
Nov. 25, 2021 (JP) .................. 2021-191103

(51) Int. Cl.
*F16B 5/02* (2006.01)
(52) U.S. Cl.
CPC ...................... *F16B 5/02* (2013.01)
(58) Field of Classification Search
CPC ...... F16B 5/02; F16B 2/005; F16B 2200/506; F16B 33/008; F16B 37/00; F16B 39/282; F16B 5/00; F16B 5/065; B60G 13/003
See application file for complete search history.

(56) References Cited

U.S. PATENT DOCUMENTS 7,014,386 B1 * 3/2006 Mullet ................ F16B 25/0021
411/188
2008/0247817 A1 10/2008 Geislinger et al.
(Continued)

FOREIGN PATENT DOCUMENTS

DE    10 2012 220 348 A1    6/2014
DE    102015202037 A1 *    8/2016 .............. F16B 2/005
(Continued)

OTHER PUBLICATIONS

English translation DE102020105883 (Year: 2021).*
(Continued)

*Primary Examiner* — Jason L Vaughan
*Assistant Examiner* — Amanda Kreiling
(74) *Attorney, Agent, or Firm* — Studebaker Brackett PLLC (57) ABSTRACT

A joint structure increases fastening force between a first member and a second member while preventing peeling of an anti-rust coating film of the first member. The joint structure includes the first member in which the anti-rust coating film is formed by electrodeposition on a surface of a metallic base material; the second member that contacts the first member; and fastening members that fasten the first and second members together. Plural convex portions, each having a height less than a thickness of the electrodeposition coating film, are disposed in at least a part of a surface of the second member that contacts the first member. The first member and the second member are fastened by the fastening members such that the electrodeposition coating film of the first member and the convex portions mesh with each other without the base material of the first member contacting the convex portions.

17 Claims, 8 Drawing Sheets

(56) References Cited

U.S. PATENT DOCUMENTS

2012/0155988 A1\* 6/2012 Schumacher .......... F16B 31/02
411/369
2017/0335869 A1 11/2017 Bui et al.

FOREIGN PATENT DOCUMENTS

DE 102020105883 A1 \* 9/2021
JP H01-266309 A 10/1989

OTHER PUBLICATIONS

English translation DE102015202037 (Year: 2016).\*
Office Action issued in DE 10 2022 129 537.0 ; mailed by the German Patent and Trademark Office on Jan. 8, 2025.

\* cited by examiner

JOINT STRUCTURE, METHOD FOR DESIGNING JOINT STRUCTURE, AND METHOD FOR MANUFACTURING JOINT STRUCTURE

TECHNICAL FIELD

The present disclosure relates to a joint structure that fastens two members, a method for designing the same, and a method for manufacturing the same.

BACKGROUND

Conventionally, in a structure for fastening two members by a fastening member, in order to increase a fastening force it is known to subject a seat surface of the fastening member to surface treatment to increase a friction coefficient.

For example, in a fastening structure disclosed in Japanese Patent document JP-A-1-266309, a ceramic plasma spray treatment is performed on a joint surface around a bolt hole to make a front surface of the joint surface around the bolt hole a rough surface. In this way, when a bolt is fastened to the bolt hole, a fastening force is increased by increasing a friction coefficient between a bolt head and the joint surface.

SUMMARY

When a member to be fastened requires an anti-rust property, an electrodeposition coating such as cationic coating may be applied to a surface of a base material that constitutes the member. In a structure for fastening the member formed with an electrodeposition coating film on the base material surface to another member, in order to increase the friction coefficient, a washer is interposed between the bolt head and the member formed with the electrodeposition coating film, and a surface of the washer facing the electrodeposition coating film side is roughened as described above to form a convex portion.

However, since an anti-rust coating film such as the electrodeposition coating film is extremely thin (about several tens of microns), the convex portion formed on the washer may penetrate the coating film and contact the base material surface of the member. In this case, a friction coefficient between the convex portion and the base material surface becomes a friction force factor, which worsens an effect of increasing the fastening force.

In addition, when the convex portion penetrates the coating film and contacts the base material surface, a tip of the convex portion is likely to slide along the base material surface, which possibly peels off the coating film and forms rust on the base material surface.

The present disclosure has been made in view of the above circumstance and therefore has a purpose of providing a joint structure in which a first member having an anti-rust coating film is joined to a second member, the joint structure capable of increasing a fastening force between the first member and the second member while preventing peeling of the anti-rust coating film of the first member.

A joint structure according to the present disclosure includes a first member in which an anti-rust coating film is formed on a surface of a metallic base material; a second member that contacts the first member; and a fastening member that fastens the first member and the second member. Plural convex portions, a height of each of which is less than a thickness of the anti-rust coating film, are formed in at least a part of a surface of the second member that contacts the first member, and the first member and the second member are fastened by the fastening member such that the anti-rust coating film of the first member and the convex portion mesh with each other without the base material of the first member contacting the convex portion.

In order to simultaneously exert two effects, which seem to be incompatible, of increasing a fastening force and maintaining anti-rust performance by the anti-rust coating film, the present disclosure has been completed by studying the height and a fastened state of the convex portion to increase a friction coefficient.

According to the above configuration, the height of the convex portion of the second member is less than the thickness of the anti-rust coating film of the first member. Then, when the anti-rust coating film and the convex portion mesh with each other without the base material of the first member contacting the convex portion, the first member and the second member are fastened by the fastening member.

In this joint structure, the anti-rust coating film and the convex portion mesh with each other without the base material of the first member contacting the convex portion. Accordingly, when the second member is applied with a force in a sliding direction along the surface of the first member, in a state of maintaining a joined state between the base material of the first member and the anti-rust coating film, a force in a shearing direction is transmitted from the convex portion to the anti-rust coating film. Thus, due to shearing strength between the anti-rust coating film and the base material, it is possible to prevent the fastening member from sliding and to increase the fastening force between the first member and the second member.

In addition, since the convex portion does not contact the base material, the anti-rust coating film is less likely to be peeled by relative displacement between the convex portion and the base material, and it is thus possible to maintain anti-rust performance by the anti-rust coating film.

In the above joint structure, preferably, the convex portion has a sharply pointed tip.

With such a configuration, the convex portion can reliably mesh with the anti-rust coating film.

In the above joint structure, preferably, the second member is a plate material that overlaps the first member and is fastened.

With such a configuration, the convex portion is formed on the plate material that overlaps the first member and is fastened. Accordingly, with a simple structure, it is possible to obtain a joint structure capable of increasing the fastening force while preventing peeling of the coating film on the first member. In addition, the convex portion is formed on the plate material as a fastening target of the first member, and thus, a dedicated member for forming the convex portion is no longer required in addition to the plate material. Therefore, it is possible to reduce weight of the joint structure and simplify the joint structure.

In the above joint structure, preferably, the second member is a spacer, the spacer is interposed between a third member and the first member, and is fastened together with the first member and the third member, and the third member differs from the first member and the second member.

With such a configuration, the convex portion is formed on the spacer that is interposed between the first member and the third member. Thus, with the simple structure, it is possible to obtain the joint structure capable of increasing the fastening force while preventing peeling of the coating film of the first member. In addition, a contact area between the spacer and the first member can be made smaller than an area of an opposing surface between the first member and the third member, which is advantageous for an increase in a friction force.

In the above joint structure, preferably, the second member is a washer that is interposed between the first member and the fastening member.

With such a configuration, the convex portion is formed on the washer that is interposed between the first member and the fastening member. Thus, with the simple structure, it is possible to obtain the joint structure capable of increasing the fastening force while preventing peeling of the coating film of the first member.

A joint structure according to an embodiment of the present disclosure includes a first member in which an anti-rust coating film is formed on a surface of a metallic base material; a second member that overlaps the first member; and a fastening member that fastens the first member and the second member. The fastening member includes a stationary portion that does not rotate during fastening and that includes a surface contacting the anti-rust coating film of the first member. Plural convex portions, a height of each of which is less than a thickness of the anti-rust coating film, are formed in at least a part of a surface of the stationary portion. The first member and the second member are fastened by the fastening member such that the anti-rust coating film of the first member and the convex portion mesh with each other without the base material of the first member contacting the convex portion.

With such a configuration, the plural convex portions, the height of each of which is less than the thickness of the anti-rust coating film, are formed on the surface, which contacts the anti-rust coating film of the first member, in the stationary portion, which does not rotate during fastening, of the fastening member, and the height of each of the convex portions is configured to be less than the thickness of the anti-rust coating film. Then, in the state where the anti-rust coating film and the convex portion mesh with each other without the base material of the first member contacting the convex portion, the first member and the second member are fastened by the fastening member. In this joint structure, the anti-rust coating film and the convex portion mesh with each other without the base material contacting the convex portion. Thus, when any of the stationary portion of the fastening member and the first member is applied with the force in the sliding direction along the surface of the first member, the force in the shearing direction is input from the convex portion to the anti-rust coating film in a state of maintaining a joined state between the base material and the anti-rust coating film in the first member. Thus, due to shearing strength between the anti-rust coating film and the base material, it is possible to prevent the fastening member from sliding and to increase the fastening force between the first member and the second member. In addition, since the convex portion does not contact the base material, the anti-rust coating film is less likely to be peeled by relative displacement between the convex portion and the base material, and it is thus possible to maintain anti-rust performance by the anti-rust coating film.

In the above joint structure, preferably, the joint structure is applied to fasten a suspension crossmember and a suspension in a vehicle, one of the suspension crossmember and the suspension includes the first member, and the other thereof includes the second member.

With such a configuration, the above joint structure, in which the anti-rust coating film and the convex portion mesh with each other without the base material contacting the convex portion, is applied to fasten the suspension crossmember and the suspension, and the fastened portion therebetween is a portion applied with the large shearing force in the vehicle. In this way, it is possible to increase the fastening force without increasing a shaft diameter or an outer diameter of the fastening member. In addition, it is possible to reduce the weight of the fastening structure between the suspension crossmember and the suspension.

In the above joint structure, preferably, the joint structure is applied to fasten a vehicle body and a suspension in a vehicle, one of the vehicle body and the suspension includes the first member, and the other thereof includes the second member.

With such a configuration, the above joint structure, in which the anti-rust coating film and the convex portion mesh with each other without the base material contacting the convex portion, is applied to fasten the vehicle body and the suspension, and the fastened portion therebetween is a portion applied with the large shearing force in the vehicle. In this way, it is possible to increase the fastening force without increasing the shaft diameter or the outer diameter of the fastening member. In addition, it is possible to reduce the weight of the fastening structure between the vehicle body and the suspension.

In the above joint structure, preferably, the joint structure is applied to fasten a battery unit, which is mounted on a vehicle, and a vehicle body, one of the battery unit and the vehicle body includes the first member, and the other thereof includes the second member.

With such a configuration, the above joint structure, in which the anti-rust coating film and the convex portion mesh with each other without the base material contacting the convex portion, is applied to fasten the battery unit, which is mounted on the vehicle, and the vehicle body, and the fastened portion therebetween is a portion applied with the large shearing force in the vehicle. In this way, it is possible to increase the fastening force without increasing the shaft diameter or the outer diameter of the fastening member. In addition, it is possible to reduce the weight of the fastening structure between the battery unit and the vehicle body.

A method for designing a joint structure according to the present disclosure in which a first member and a second member are fastened by a fastening member, the first member being formed with an anti-rust coating film on a surface of a metallic base material and the second member being formed with a convex portion in at least a part of a surface contacting the first member, includes a convex portion height determination step for determining a height of the convex portion to be less than a thickness of the anti-rust coating film; and an axial force determination step of determining an axial force of the fastening member, with which the convex portion having the height determined in the convex portion height determination step can mesh with a coating film of the first member without the convex portion contacting the base material of the first member.

In the above design method, in the convex portion height determination step, the height of the convex portion is determined to be less than the thickness of the anti-rust coating film. Then, in the axial force determination step, the axial force of the fastening member, with which the convex portion having the height determined in the convex portion height determination step can mesh with the coating film of the first member without the convex portion contacting the base material of the first member, is determined. In this design method, it is possible to reliably design the joint structure in which the convex portion can mesh with the anti-rust coating film without contacting the base material of the first member. In this way, it is possible to easily and reliably design the joint structure capable of increasing the fastening force while preventing peeling of the coating film of the first member.

A method for manufacturing a joint structure according to the present disclosure that joins a first member and a second member includes a preparation step for preparing the first member in which an anti-rust coating film is formed on a surface of a metallic base material, the second member having a convex portion in a height less than a thickness of the anti-rust coating film in at least a part of a surface contacting the first member, and a fastening member that fastens the first member and the second member; a positioning step for positioning the first member and the second member such that the convex portion opposes the anti-rust coating film; and a fastening step for fastening the first member and the second member by the fastening member with an axial force of the fastening member capable of meshing with the anti-rust coating film without the convex portion contacting the base material of the first member.

In the above manufacturing method, by sequentially executing the preparation step, the positioning step, and the fastening step described above, it is possible to reliably manufacture the joint structure in which the convex portion meshes with the anti-rust coating film without contacting the base material of the first member. In this way, it is possible to easily and reliably manufacture the joint structure capable of increasing the fastening force while preventing peeling of the coating film of the first member.

In the joint structure according to the present disclosure, the first member having the anti-rust coating film is fastened to the second member, and can increase the fastening force between the first member and the second member while preventing peeling of the anti-rust coating film of the first member.

In the method for designing the joint structure according to the present disclosure, it is possible to reliably design the joint structure capable of increasing the fastening force between the first member and the second member while preventing peeling of the anti-rust coating film of the first member.

According to the method for manufacturing the joint structure according to the present disclosure, it is possible to reliably manufacture the joint structure capable of increasing the fastening force between the first member and the second member while preventing peeling of the anti-rust coating film of the first member.

DETAILED DESCRIPTION

A detailed description will hereinafter be made of an embodiment of the present disclosure with reference to the accompanying drawings.

First Embodiment

Figure 1:
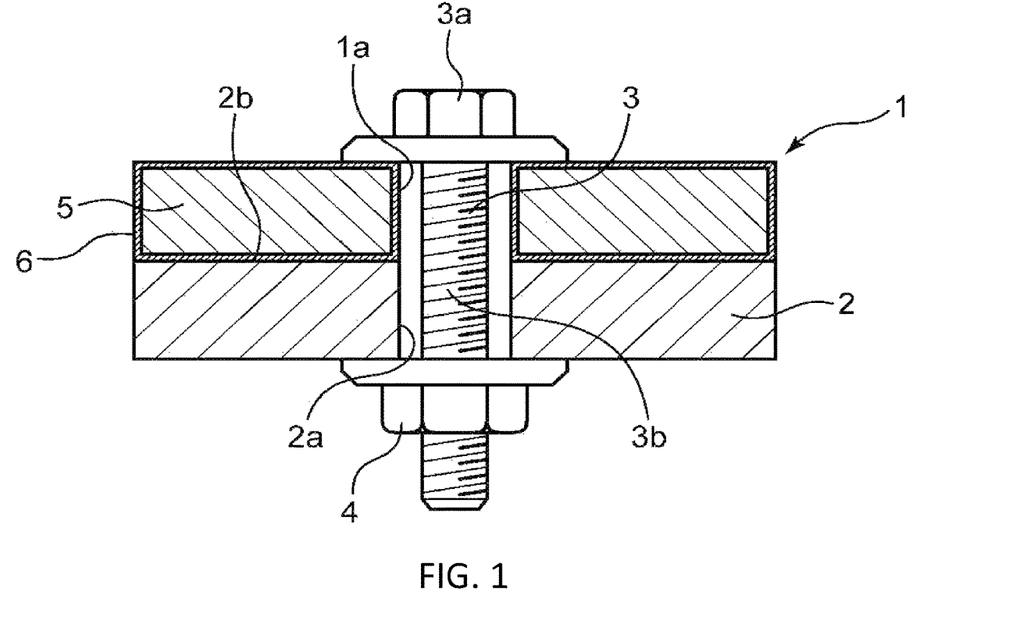
FIG. 1 is a cross-sectional explanatory view illustrating a joint structure according to a first embodiment of the present disclosure, in which a first member having an electrodeposition coating film as an anti-rust coating film and a plate material as a second member are fastened.

As illustrated in FIG. 1, a joint structure in a first embodiment includes: a first member 1 that is formed with an electrodeposition coating film 6 as an example of an anti-rust coating film on a surface 5a (see FIG. 2) of a metallic base material 5; a second member 2 that is arranged in a manner to overlap the first member 1 from below and contacts the first member 1; and a bolt 3 and a nut 4 as fastening members that fasten the first member 1 and the second member 2. The anti-rust coating films in the present disclosure include the electrodeposition coating film, an Al—Zn frame composite coating film, and the like. In this embodiment, the electrodeposition coating film 6 is an example of the anti-rust coating film.

The base material 5 of the first member 1 is formed of a metal material, such as steel, that is generally used for a machine part. The electrodeposition coating film 6 is formed to have a uniform film thickness on the surface 5a of the base material 5 by applying electrodeposition coating such as cationic coating to the base material 5. A through hole 1a in which the bolt 3 can be inserted is formed in the first member 1. A shape of the first member 1 is not limited to a particular shape in the disclosure, but a plate member may be employed as the first member 1.

In this embodiment, the second member 2 is a plate material that overlaps the first member 1 and is fastened. In the second member 2, a through hole 2a in which the bolt 3 can be inserted is formed at a position that corresponds to the through hole 1a of the first member 1. The plate materials that are adopted as the first member 1 and the second member 2 each mean a material in a thickness that can be fastened by the fastening member, and include various materials, such as a press material, an extruded material, a casting, and a forging, that are not limited by manufacturing methods.

The second member 2 is formed of a material that can firmly be fastened to the first member 1, and is manufactured by the metal material such as steel. However, the second member 2 can also be manufactured by using a hard resin or the like.

Figure 2:
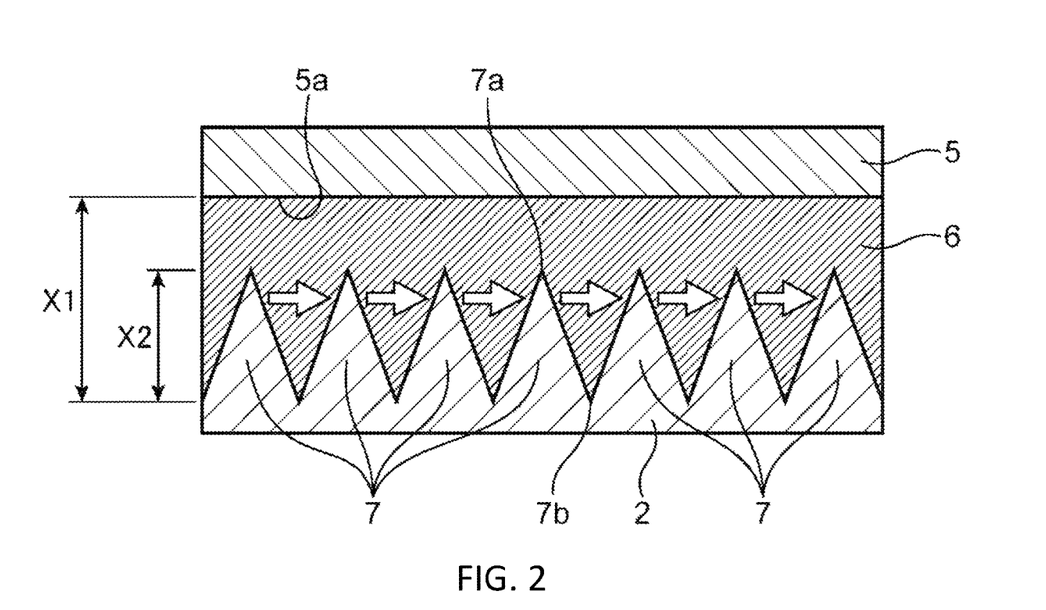
FIG. 2 is a cross-sectional explanatory view illustrating a state where a convex portion formed on an upper surface of the plate material in FIG. 1 meshes with the electrodeposition coating film without contacting a base material of the first member.

As illustrated in FIG. 2, in at least a part of a surface of the second member 2 that contacts the first member 1 (that is, an upper surface 2b in FIG. 1), plural convex portions 7, a height X2 of each of the convex portions 7 is less than a thickness X1 of the electrodeposition coating film 6 are formed. The convex portion 7 only needs to be formed on at least a part of the surface of the second member 2 that contacts the first member 1. For example, in the first embodiment, the convex portions 7 are formed on the entire upper surface 2b of the second member 2, but may only be formed around the through hole 2a on the upper surface 2b.

Here, in a fastened state of the bolt 3 and the nut 4, the thickness X1 of the electrodeposition coating film 6 is equal to a distance between a root end 7b of the convex portion 7 and the surface 5a of the base material 5.

The thickness X1 of the electrodeposition coating film 6 is about several tens of microns (for example, 10 to 90 μm) and is extremely thin. As a method for forming the convex portion 7 in a height that is less than the thickness X1 of this electrodeposition coating film 6 (for example, a height that is less than 20 μm), for example, a technique of microfabricating a surface of a substrate in a unit of several microns in manufacturing of semiconductors, for example, shot blasting using ultra-fine particles is adopted.

The convex portion 7 is formed to have a sharply pointed tip 7a. Thus, the convex portion 7 can easily bite into the electrodeposition coating film 6. An angle of the tip 7a of the convex portion 7 is set to such an angle at which the convex portion 7 can easily bite into the electrodeposition coating film 6 and the tip 7a is not damaged.

The height of each of the convex portions 7, the angle of the tip 7a of each of the convex portions 7, a formation range of the convex portions 7, and a degree of the convex portions 7 being dense (density) are set in comprehensive consideration of a material characteristic of the second member 2 having the convex portions 7, a material characteristic of the electrodeposition coating film 6, another condition, and the like in order to obtain a required fastening force in the joint structure.

As illustrated in FIG. 1, the first member 1 and the second member 2 are fastened by threading the nut 4 into a tip of the bolt 3 in a state where a shaft 3b of the bolt 3 penetrates the through holes 1a, 2a.

In this fastened state, as illustrated in FIG. 2, the first member 1 and the second member 2 are fastened by the bolt 3 and the nut 4 in a state where the electrodeposition coating film 6 of the first member 1 meshes with the convex portion 7 without the base material 5 of the first member 1 contacting the convex portion 7.

When the bolt 3 and the nut 4 are fastened, a head 3a of the bolt 3 and the nut 4 fasten the first member 1 and the second member 2 from both of upper and lower sides, respectively, which generates an axial force on the shaft 3b of the bolt 3.

This axial force is managed by fastening torque of the bolt 3 and the nut 4.

Characteristics of First Embodiment (1)

As illustrated in FIG. 2, the joint structure of the first embodiment is configured that the convex portion 7 of the second member 2 has the height X2 that is less than the thickness X1 of the electrodeposition coating film 6 of the first member 1. In addition, in the state where the electrodeposition coating film 6 and the convex portion 7 mesh with each other without the base material 5 of the first member 1 contacting the convex portion 7, the first member 1 and the second member 2 are fastened by the bolt 3 and the nut 4 as the fastening members.

In this joint structure, the electrodeposition coating film 6 and the convex portion 7 mesh with each other without the base material 5 contacting the convex portion 7. Thus, when the second member 2 is applied with a force in a sliding direction along the surface of the first member 1 (see arrows in FIG. 2), a force in a shearing direction is transmitted from the convex portion 7 to the electrodeposition coating film 6 in a state of maintaining a joined state between the base material 5 and the electrodeposition coating film 6 in the first member 1. Accordingly, due to shearing strength between the electrodeposition coating film 6 and the base material 5, it is possible to prevent the bolt 3 and the nut 4 from sliding and to increase the fastening force between the first member 1 and the second member 2. In addition, since the convex portion 7 does not contact the base material 5, the electrodeposition coating film 6 is less likely to be peeled by relative displacement between the convex portion 7 and the base material 5, and it is thus possible to maintain anti-rust performance by the electrodeposition coating film 6.

Figure 3:
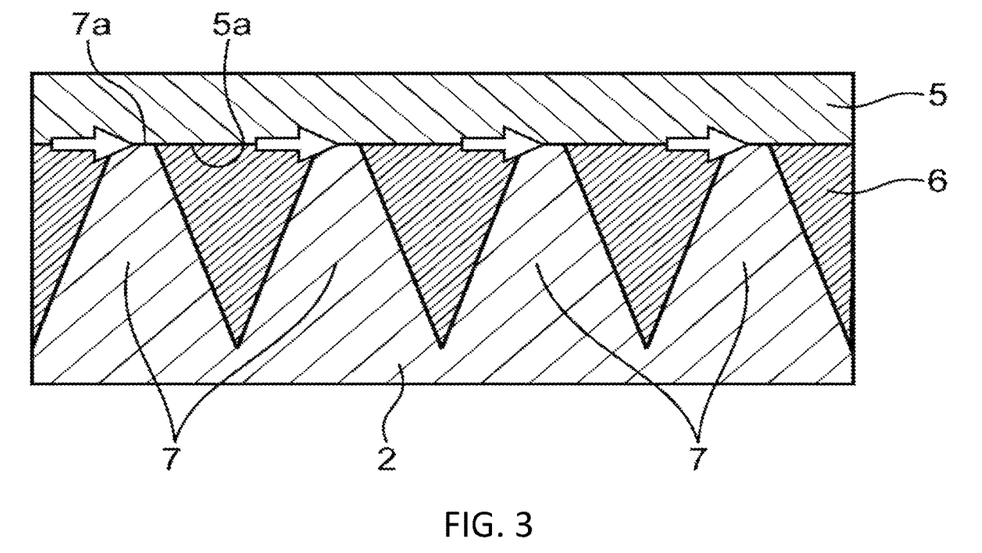
FIG. 3 is a cross-sectional explanatory view illustrating, as a comparative example of FIG. 2, a state where a convex portion of the second member penetrates the electrodeposition coating film of the first member and contacts the base material in the conventional joint structure.

Meanwhile, in the conventional joint structure as the comparative example, the height and the fastened state of the convex portion 7 are not taken into consideration. Thus, as illustrated in FIG. 3, the convex portion 7 penetrates the thin electrodeposition coating film 6, and the tip 7a of the convex portion 7 contacts the surface 5a of the base material 5 of the first member 1. For this reason, a friction coefficient between the convex portion 7 and the base material surface 5a becomes a friction force factor, which worsens an effect of increasing the fastening force. In addition, as illustrated in FIG. 3, in a state where the convex portion 7 penetrates the electrodeposition coating film 6 and contacts the base material surface 5a, the tip 7a of the convex portion 7 is likely to slide along the base material surface 5a, which easily peels off the electrodeposition coating film 6 and easily forms rust on the base material surface 5a.

In consideration of these points, it is possible to reliably obtain the structure, in which the convex portion 7 meshes with the electrodeposition coating film 6 without contacting the base material 5, by adopting the joint structure in this embodiment illustrated in FIGS. 1 to 2. Thus, it is clearly understood that the fastening force can be increased and the anti-rust performance can be maintained at the same time.

Next, a description will be made on a point that a sliding friction coefficient ("SLIDING μ" on a vertical axis in FIG. 4) in the joint structure of this embodiment is improved when compared to that in the conventional joint structure with reference to a graph in FIG. 4. In the graph illustrated in FIG. 4, a horizontal axis represents a surface pressure (MPa), and the vertical axis represents the sliding friction coefficient (dimensionless).

Figure 4:
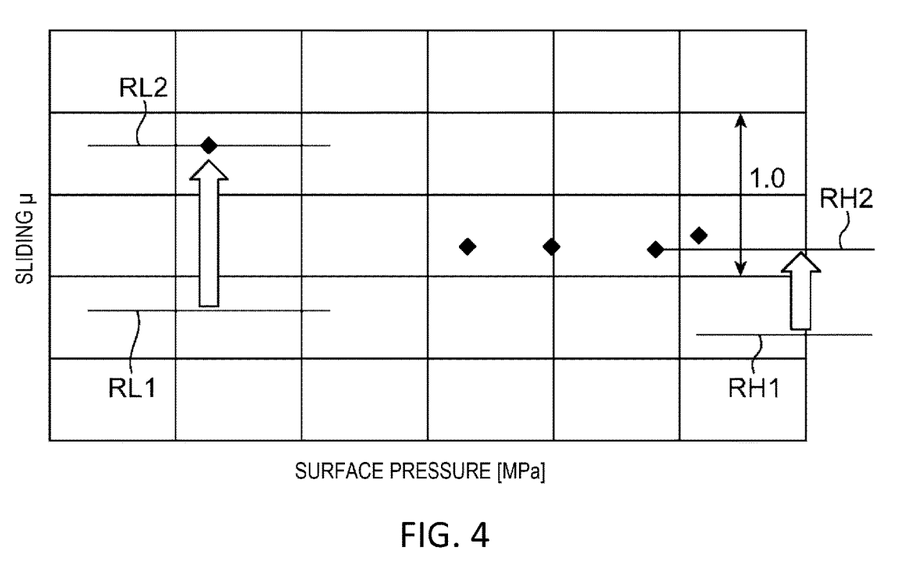
FIG. 4 is a graph illustrating that a sliding friction coefficient is improved over an entire range of a surface pressure in the joint structure of this embodiment when compared that in the current joint structure as a comparative example.
Figure 12:
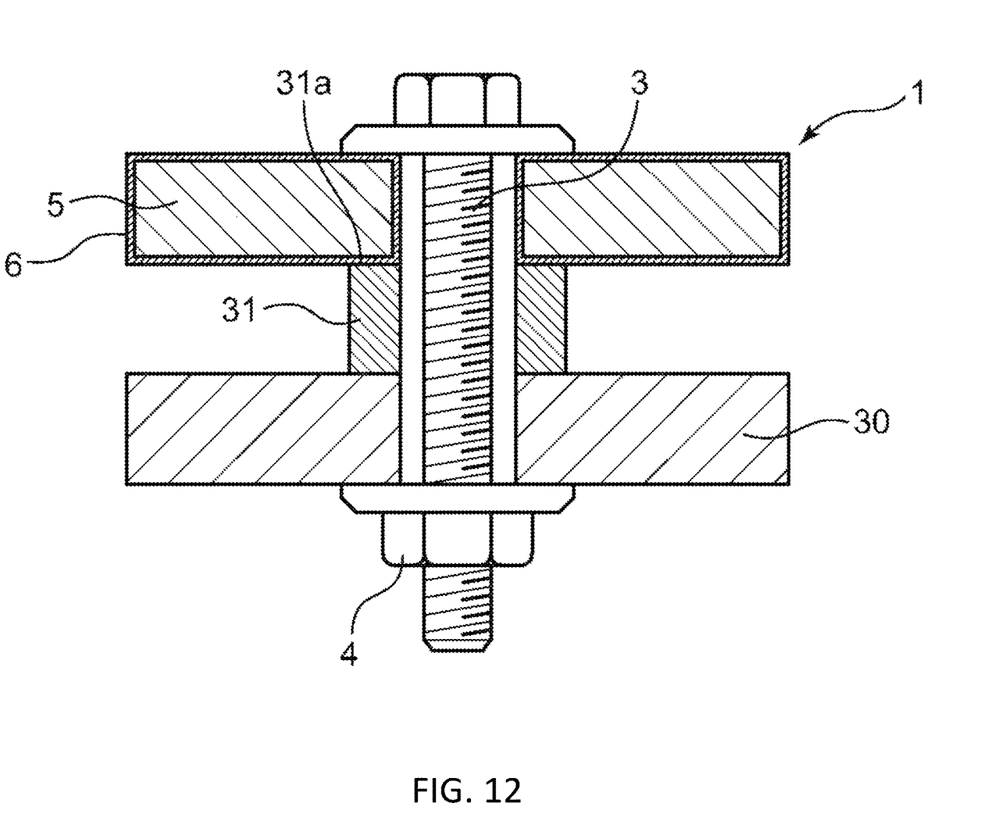
FIG. 12 is a cross-sectional explanatory view illustrating a joint structure according to a comparative example, in which a first member having an electrodeposition coating film, a third member, and a spacer as a second member having a convex portion are fastened in a state where the spacer is interposed between the first member and the third member.

Levels of RL1, RH1 in FIG. 4 respectively indicate magnitudes of the sliding friction coefficient in the case where the surface pressure is low and high in the conventional joint structure as the comparative example. More specifically, as illustrated in FIG. 12, the conventional joint structure is a structure in which the first member 1, a third member 30, and a spacer 31 are fastened by the bolt 3 and the nut 4 in a state where the spacer 31 as the second member is interposed between the first member 1 having the electrodeposition coating film 6 and the third member 30. The convex portion 7 illustrated in FIG. 3 is formed on an upper surface 31a of this spacer 31, penetrates the electrodeposition coating film 6 of the first member 1, and contacts the surface 5a of the base material 5.

In this joint structure illustrated in FIG. 12, in the spacer 31, an area of the upper surface 31a that contacts the electrodeposition coating film 6 of the first member 1 is small, and the upper surface 31a bites into and is joined to the first member 1. Thus, compared to a case where the third member 30 opposing the first member 1 directly contacts the first member 1, the sliding friction coefficient can be increased by the biting portion. However, despite such an advantageous structure with the increased friction coefficient, in this conventional joint structure, as illustrated in FIG. 3, the convex portion 7 penetrates the electrodeposition coating film 6 and contacts the base material surface 5a. Thus, the fastening force is not sufficiently increased, and it is possible to increase the sliding friction coefficient.

Meanwhile, in the joint structure of this embodiment illustrated in FIGS. 1 to 2, the convex portions 7 are formed on the entire surface of the second member 2 as the plate material. In addition, despite the configuration that the surface pressure is not easily applied and thus is disadvantageous in terms of sliding, the sliding friction coefficients, such as the levels RL2, RH2 in FIG. 4, are significantly improved from the levels RL2, RH2 in the above conventional joint structure when the surface pressure is low and high, respectively (in FIG. 4, the sliding friction coefficient is improved by approximately 60 to 120% and thus is equivalent to that of a bolt with a larger diameter by two sizes). It is understood from seeing the result of this graph in FIG. 4, by adopting the joint structure of this embodiment illustrated in FIGS. 1 to 2, the sliding friction coefficient at the time of fastening is significantly improved, and in association therewith, the fastening force is significantly improved in the structure in which the convex portion 7 meshes with the electrodeposition coating film 6 without contacting the base material 5.

In addition, in the joint structure of this embodiment, the fastening force is improved. Thus, the bolt 3 and the nut 4 as the fastening members can be changed to those in smaller sizes than the conventional ones, which can downsize the entire joint structure.

(2)

In the joint structure of the first embodiment, the tip 7a of the convex portion 7 has the sharply pointed shape. In this way, the convex portion 7 can reliably mesh with the electrodeposition coating film 6.

(3)

In the joint structure of the first embodiment, the second member 2 is the plate material that overlaps the first member 1 and is fastened. In this configuration, the convex portion 7 is formed in the plate material that overlaps the first member 1 and is fastened. Thus, with the simple structure, it is possible to obtain the joint structure capable of increasing the fastening force while preventing peeling of the coating film on the first member 1. In addition, the convex portion 7 is formed in the plate material as a fastening target of the first member 1. Thus, a dedicated member for forming the convex portion 7 is no longer required in addition to the plate material. Therefore, it is possible to reduce weight and simplify the joint structure.

Method for Designing Joint Structure

When the joint structure in the first embodiment illustrated in FIGS. 1 to 2 is designed, such a joint structure may be designed by the following procedure.

That is, a method for designing the joint structure illustrated in FIGS. 1 to 2 is a method for designing the joint structure in which the first member 1 and the second member 2 are fastened by the bolt 3 and the nut 4 as the fastening members, in the first member 1, the electrodeposition coating film 6 being formed on the surface 5a of the metallic base material 5, and in the second member 2, the convex portion 7 being formed on at least a part of the surface (the upper surface 2b in FIG. 1) contacting the first member 1. The method includes a convex portion height determination step for determining the height X2 of the convex portion 7 as the height X2 that is less than the thickness X1 of the electrodeposition coating film 6; and an axial force determination step for determining the axial force of the bolt 3 and the nut 4 with which the convex portion 7 in the height X2 determined in the convex portion height determination step can mesh with the coating film of the first member 1 without contacting the base material 5 of the first member 1.

In the above design method, in the convex portion height determination step, the height X2 of the convex portion 7 is determined as the height X2 that is less than the thickness X1 of the electrodeposition coating film 6. Then, in the axial force determination step, the axial force of the bolt 3 and the nut 4, with which the convex portion 7 in the height X2 determined in the convex portion height determination step can mesh with the electrodeposition coating film 6 of the first member 1 without contacting the base material 5 of the first member 1, is determined. In this design method, it is possible to reliably design the joint structure in which the convex portion 7 can mesh with the electrodeposition coating film 6 without contacting the base material 5 of the first member 1. In this way, it is possible to easily and reliably design the joint structure capable of increasing the fastening force while preventing peeling of the electrodeposition coating film 6 of the first member 1.

Method for Manufacturing Joint Structure

The joint structure in the first embodiment illustrated in FIGS. 1 to 2 may be manufactured by the following procedure.

A method for manufacturing the joint structure illustrated in FIGS. 1 to 2 is a method for manufacturing the joint structure for joining the first member 1 and the second member 2. The method includes:

a preparation step for preparing the first member 1, the second member 2, the bolt 3, and the nut 4, in the first member 1, the electrodeposition coating film 6 being formed on the surface 5a of the metallic base material 5, in the second member 2, the convex portion 7 in the height X2 that is less than the thickness X1 of the electrodeposition coating film 6 being provided on at least a part of the surface (the upper surface 2b in FIG. 1) contacting the first member 1, and the bolt 3 and the nut 4 being the fastening members that fasten the first member 1 and the second member 2;

a positioning step for positioning the first member 1 and the second member 2 such that the convex portion 7 opposes the electrodeposition coating film 6; and a fastening step for fastening the first member 1 and the second member 2 by the bolt 3 and the nut 4 with the axial force of the bolt 3 (more specifically, the shaft 3b), with which the convex portion 7 can mesh with the electrodeposition coating film 6 without contacting the base material 5 of the first member 1.

In the fastening step, the axial force of the bolt 3 is managed by the fastening torque of the bolt 3 and the nut 4.

In the above manufacturing method, by sequentially executing the preparation step, the positioning step, and the fastening step described above, it is possible to reliably manufacture the joint structure in which the convex portion 7 meshes with the electrodeposition coating film 6 without contacting the base material 5 of the first member 1. In this way, it is possible to easily and reliably manufacture the joint structure capable of increasing the fastening force while preventing peeling of the coating film of the first member 1.

Second Embodiment

In the first embodiment, the second member 2 having the convex portion 7 is constructed of the plate material that overlaps the first member 1 and is fastened. However, the present disclosure is not limited thereto. The second member having the convex portion 7 may be another member.

Figure 5:
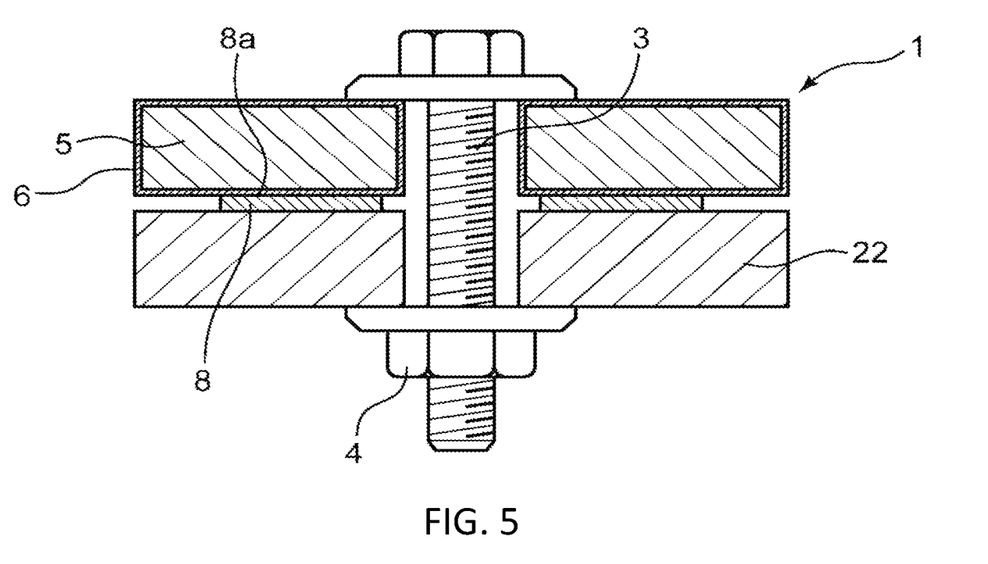
FIG. 5 is a cross-sectional explanatory view illustrating a joint structure according to a second embodiment of the present disclosure, in which a first member having an electrodeposition coating film, a third member, and a spacer as a second member having a convex portion are fastened in a state where the spacer is interposed between the first member and the third member.

For example, in the joint structure of the second embodiment illustrated in FIG. 5, a spacer 8 is adopted as a second member having the above convex portion 7. The spacer 8 is interposed between a third member 22, which differs from the first member 1 and the second member 2, and the first member 1 and is fastened together with the first member 1 and the third member 22. The plural convex portions 7, each of which is projected upward as illustrated in FIG. 2, are formed on an upper surface 8a of the spacer 8 that opposes the electrodeposition coating film 6 of the first member 1. For example, the convex portions 7 are formed on the entire upper surface 8a of the spacer 8. However, the convex portions 7 may only be formed in a portion near a center of the spacer 8.

Also, in this joint structure of the second embodiment, similar to the joint structure in the first embodiment, it is configured that the height of the convex portion 7 is less than the thickness of the electrodeposition coating film 6 of the first member 1. In addition, in the state where the electrodeposition coating film 6 and the convex portion 7 mesh with each other without the base material 5 of the first member 1 contacting the convex portion 7, the first member 1 and the spacer 8 as the second member 2 are fastened by the bolt 3 and the nut 4 as the fastening members.

In the joint structure of the second embodiment, the convex portion 7 is formed in the spacer 8 that is interposed between the first member 1 and the third member 22. Thus, with the simple structure, it is possible to obtain the joint structure capable of increasing the fastening force while preventing peeling of the electrodeposition coating film 6 of the first member 1. In addition, a contact area between the spacer 8 and the first member 1 can be made smaller than an area of an opposing surface between the first member 1 and the third member 22, which is advantageous for the increase in the friction force.

Furthermore, the third member 22, which is fastened to the first member 1, does not have to be formed with the convex portion 7. Thus, a degree of freedom in design of the third member 22 is increased.

Also, in the second embodiment, it is possible to exert operational effects in (1) and (2) of "Characteristics of First Embodiment" described above.

Moreover, the design method and the manufacturing method in the first embodiment can also be applied to the joint structure in the second embodiment.

Third Embodiment

Figure 6:
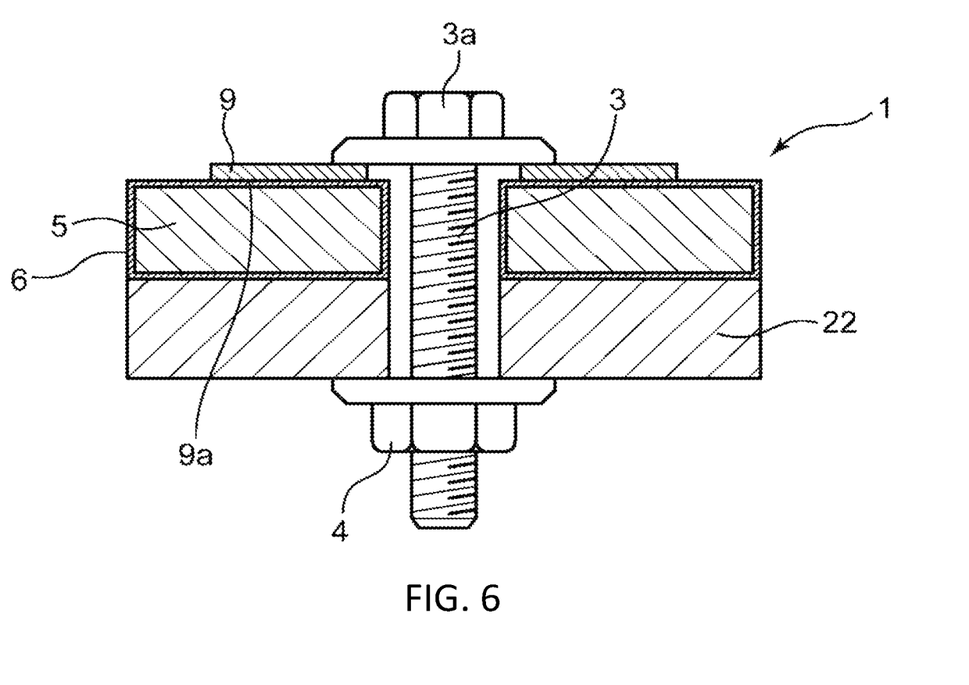
FIG. 6 is a cross-sectional explanatory view illustrating a joint structure according to a third embodiment of the present disclosure in which a washer as a second member having a convex portion, a first member having an electrodeposition coating film, and a third member are fastened in a state where the washer is interposed between the first member and a bolt head.
Figure 7:
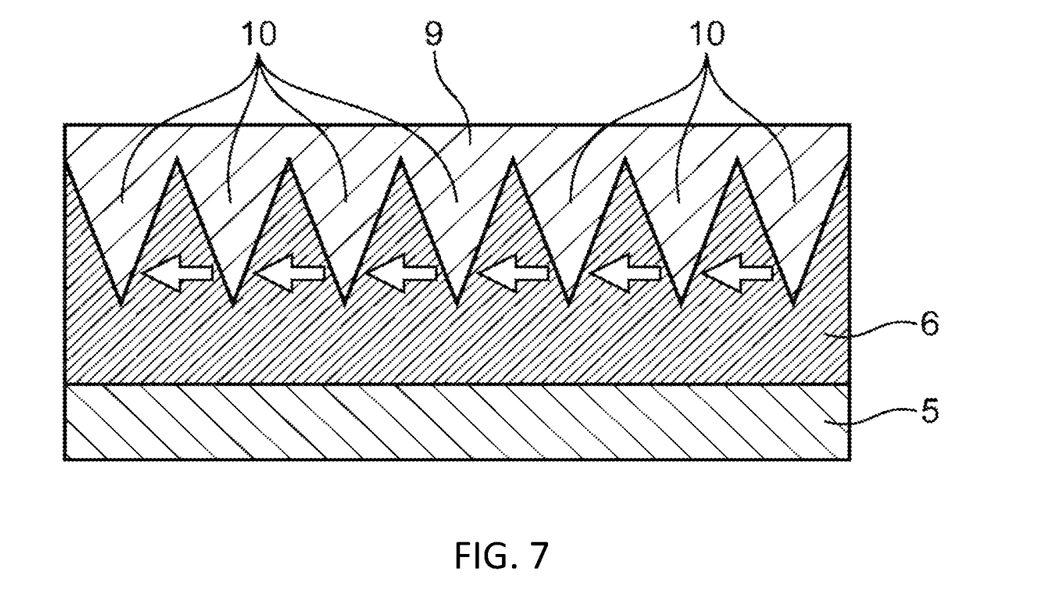
FIG. 7 is a cross-sectional explanatory view illustrating a state where the convex portion formed on a lower surface of the washer in FIG. 6 meshes with the electrodeposition coating film without contacting a base material of the first member.

In a joint structure of a third embodiment illustrated in FIG. 6, a washer 9 is adopted as a second member having a convex portion 10 (see FIG. 7). The washer 9 is interposed between the first member 1 and the head 3a of the bolt 3 as the fastening member. In the joint structure illustrated in FIG. 6, in a state where the washer 9 is interposed between the first member 1 having the electrodeposition coating film 6 and the head 3a of the bolt 3, the washer 9, the first member 1, and the third member 22 are fastened by the bolt 3 and the nut 4 as the fastening members.

As illustrated in FIG. 7, plural convex portions 10, each of which is projected downward, are formed on a lower surface 9a (see FIG. 6) of the washer 9 that opposes the electrodeposition coating film 6 of the first member 1. For example, the convex portions 10 are formed on the entire lower surface 9a of the washer 9. However, the convex portions 10 may only be formed in a portion near a center of the washer 9.

Also, in this joint structure of the third embodiment, similar to the joint structure in the first embodiment, it is configured that the height of the convex portion 10 is less than the thickness of the electrodeposition coating film 6 of the first member 1. In addition, in the state where the electrodeposition coating film 6 and the convex portion 10 mesh with each other without the base material 5 of the first member 1 contacting the convex portion 10, the first member 1 and the washer 9 as the second member 2 are fastened by the bolt 3 and the nut 4 as the fastening members.

In the joint structure of the third embodiment, the convex portion 10 is formed in the washer 9 that is interposed between the first member 1 and the head 3a of the bolt 3. Thus, with the simple structure, it is possible to obtain the joint structure capable of increasing the fastening force while preventing peeling of the electrodeposition coating film 6 of the first member 1.

In addition, the third member 22, which is fastened to the first member 1, does not have to be formed with the convex portion 7 (see FIG. 2). Thus, the degree of freedom in design of the third member 22 is increased.

Also, in the joint structure of the third embodiment, it is possible to exert the operational effects in (1) and (2) of "Characteristics of First Embodiment" described above.

Moreover, the design method and the manufacturing method in the first embodiment can also be applied to the joint structure in the third embodiment.

Fourth Embodiment

Even in the case where the above convex portion 10, which meshes with the electrodeposition coating film 6 of the first member 1, is provided to a stationary portion of the bolt as the fastening member, it is possible to exert similar operational effects to (1) and (2) of "Characteristics of First Embodiment" described above.

Figure 8:
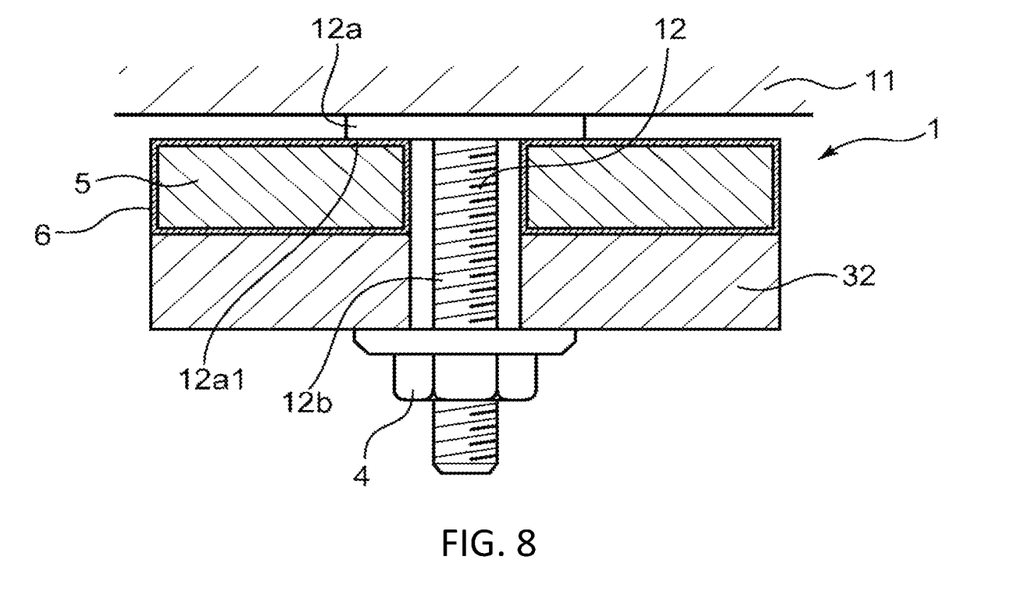
FIG. 8 is a cross-sectional explanatory view illustrating a joint structure according to a fourth embodiment of the present disclosure, in which a first member having an electrodeposition coating film and a second member are fastened in a state where a convex portion is formed on a lower surface of a head of a fixing bolt as a stationary portion of a fastening member and the head contacts the first member.

That is, as illustrated in FIG. 8, a joint structure in a fourth embodiment includes: the first member 1 that is formed with the electrodeposition coating film 6 on the surface 5*a* of the metallic base material 5; a second member 32 that overlaps the first member 1; and a fixing bolt 12 and the nut 4 as the fastening members that fasten the first member 1 and the second member 32. A head 12*a* of the fixing bolt 12 is fixed to a large fixing object 11, such as a vehicle body. Thus, the fixing bolt 12 remains being stationary and does not rotate when the nut 4 is fastened.

That is, the fixing bolt 12 includes the head 12*a* that is a portion that does not rotate when being fastened and is a stationary portion with a surface that contacts the electrodeposition coating film 6 of the first member 1. The plural convex portions 10 (see FIG. 7), the height of each of which is less than the thickness of the electrodeposition coating film 6, are formed on a surface of the head 12*a* that contacts the electrodeposition coating film 6 of the first member 1, that is, at least a part of a lower surface 12*a*1. The above convex portions 10 only need to be formed in at least a part of the lower surface 12*a*1. For example, in the fourth embodiment, the convex portions 10 are formed in the entire lower surface 12*a*1. However, the convex portions 10 may only be formed in a range of the lower surface 12*a*1 around a shaft 12*b*, the range contacting the electrodeposition coating film 6.

In the state where the electrodeposition coating film 6 of the first member 1 meshes with the convex portion 10 without the base material 5 of the first member 1 contacting the convex portion 10, the first member 1 and the second member 32 are fastened by the fixing bolt 12 and the nut 4.

The joint structure in the above fourth embodiment is configured that the plural convex portions 10, each of which has the height that is less than the thickness of the electrodeposition coating film 6, are formed on the lower surface 12*a*1 of the head 12*a* (the stationary portion) in the fixing bolt 12, which does not rotate when being fastened, of the fastening members and that the height of each of the convex portions 10 is less than the thickness of the electrodeposition coating film 6. The lower surface 12*a*1 contacts the electrodeposition coating film 6 of the first member 1. In the state where the electrodeposition coating film 6 meshes with the convex portion 10 without the base material 5 of the first member 1 contacting the convex portion 10, the first member 1 and the second member 32 are fastened by the fixing bolt 12 and the nut 4.

In this joint structure, the electrodeposition coating film 6 and the convex portion 10 mesh with each other without the base material 5 contacting the convex portion 10. Thus, when any of the head 12*a* of the fixing bolt 12 and the first member 1 is applied with the force in the sliding direction along the surface of the first member 1, the force in the shearing direction is input from the convex portion 10 to the electrodeposition coating film 6 in the state of maintaining the joined state between the base material 5 and the electrodeposition coating film 6 in the first member 1. Accordingly, due to the shearing strength between the electrodeposition coating film 6 and the base material 5, it is possible to prevent the fixing bolt 12 and the nut 4 from sliding and to increase the fastening force between the first member 1 and the second member 2. In addition, since the convex portion 10 does not contact the base material 5, the electrodeposition coating film 6 is less likely to be peeled by relative displacement between the convex portion 10 and the base material 5, and it is thus possible to maintain the anti-rust performance by the electrodeposition coating film 6.

As it has been described so far, it is also possible to exert the similar operational effects to (1) and (2) of "Characteristics of First Embodiment" described above in the joint structure of the fourth embodiment. The design method and the manufacturing method in the first embodiment can also be applied to the joint structure in the fourth embodiment.

Example of Application of Disclosed Joint Structure

The joint structures according to the first to fourth embodiments can be applied widely to joint structures of various machines and structures.

For example, in the case where the joint structure in the above embodiment is applied to a fastened portion between components in the vehicle, in particular, to a portion in which the large shearing force is applied to the fastened portion, it is possible to increase the fastening force without increasing a shaft diameter or an outer diameter of each of the bolt and the nut as the fastening members, and it is also possible to reduce weight of the joint structure.

Figure 9:
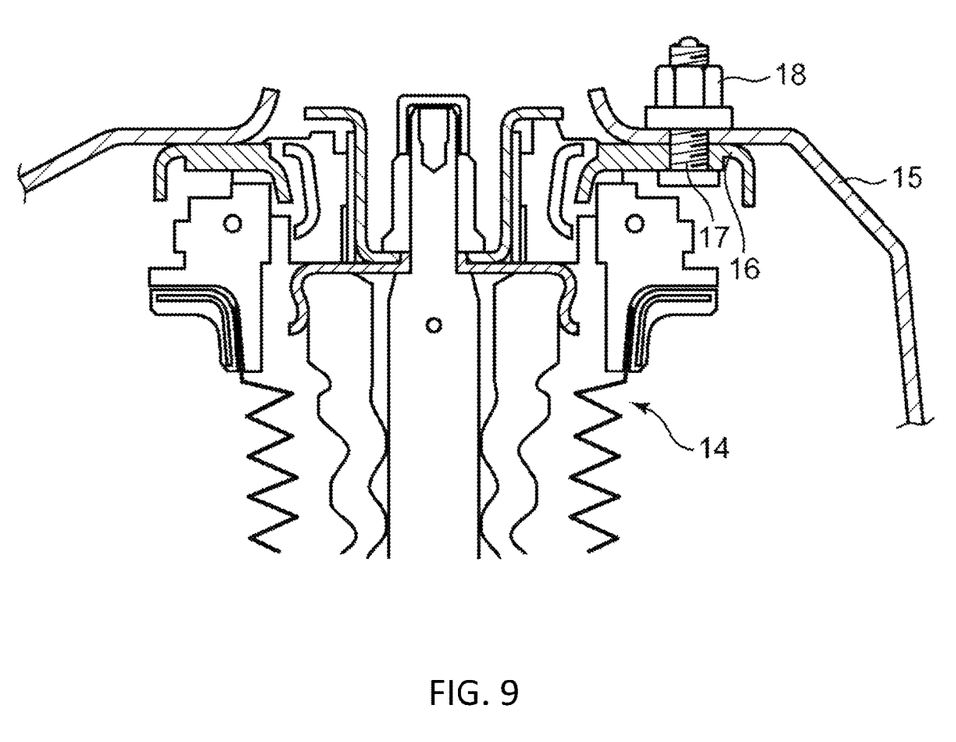
FIG. 9 is a cross-sectional explanatory view illustrating a fastened portion between a vehicle suspension system and a vehicle body as an application example of the joint structure in the present disclosure.

For example, as illustrated in FIG. 9, the joint structure is applied to fasten a body 15 and a suspension system 14 in the vehicle. The suspension system 14 has a flange 16 that is arranged beneath the body 15 in an overlapping manner. The fixing bolt 17 is fixed to the flange 16. The fixing bolt 17 penetrates the body 15. The body 15 and the flange 16 of the suspension system 14 are fastened by threading the nut 18 onto the fixing bolt 17. One of the body 15 and the flange 16 only needs to include the first member having the electrodeposition coating film in any of the first to fourth embodiments, and the other thereof only needs to include the second member having the convex portion in the respective embodiment (or, instead of the second member, the convex portion is provided to the fastening member that is fixed to the vehicle body).

The joint structure, in which the electrodeposition coating film and the convex portion mesh with each other without the base material contacting the convex portion as in any of the first to fourth embodiments, is applied to the fastened portion, which is applied with the large shearing force, between the body 15 and the suspension system 14 in the vehicle illustrated in FIG. 9. In this way, it is possible to increase the fastening force without increasing the shaft diameter or the outer diameter of each of the fixing bolt 17 and the nut 18. In addition, it is possible to reduce the weight of the fastening structure between the body 15 and the suspension system 14.

Figure 10:
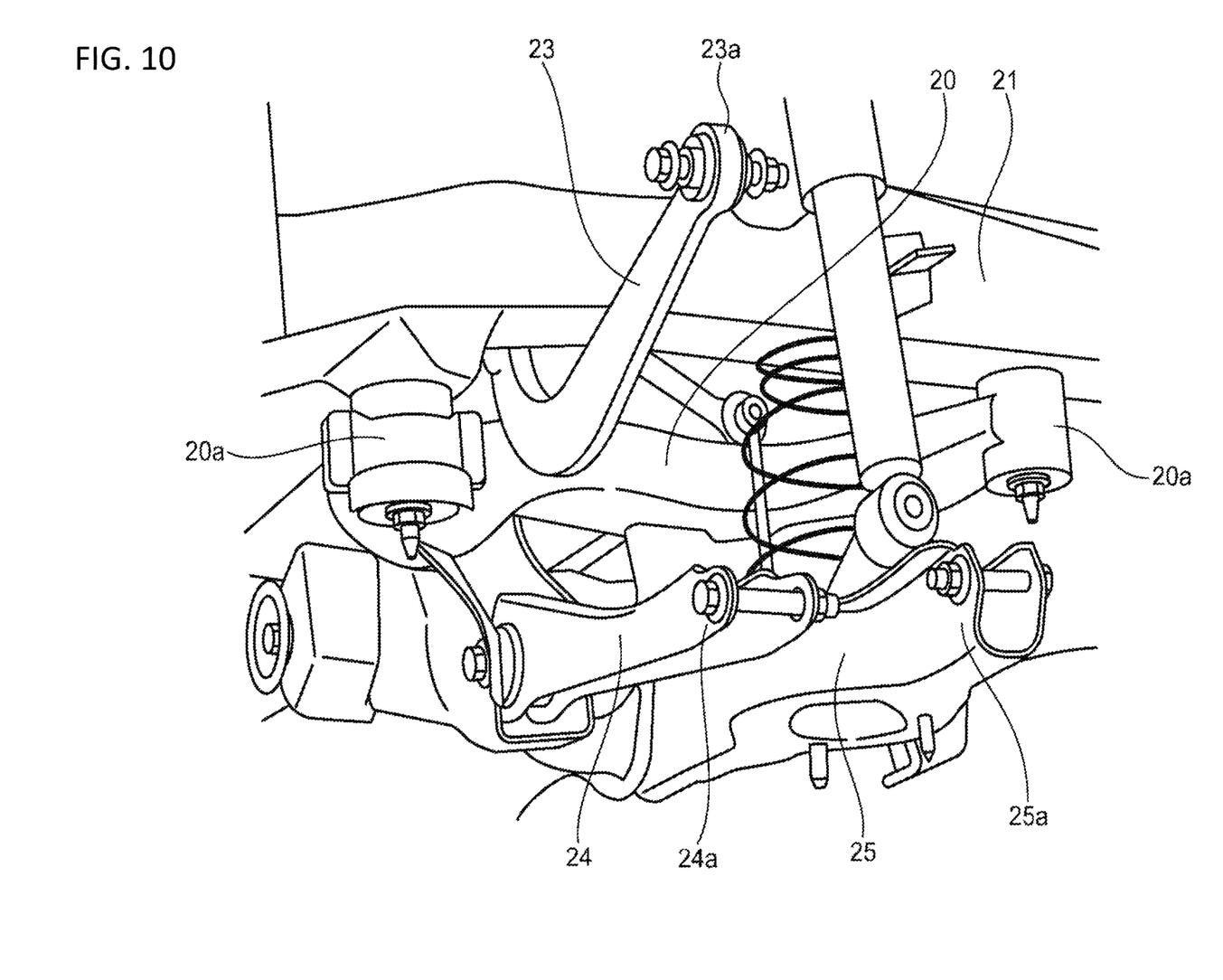
FIG. 10 is a perspective explanatory view illustrating the vehicle suspension system and the surroundings thereof as another application example of the joint structure in the present disclosure.

The joint structure according to any of the first to fourth embodiments is applied to fasten the vehicle body and a suspension in the vehicle. For example, as illustrated in FIG. 10, the joint structure according to any of the first to fourth embodiments can also be applied to a fastening structure between a rear side frame 21 of the vehicle body and a suspension crossmember 20*a* on the suspension system 20 side. One of the rear side frame 21 and the suspension crossmember 20*a* only needs to include the first member having the electrodeposition coating film in any of the first to fourth embodiments, and the other thereof only needs to include the second member having the convex portion in the respective embodiment (or, instead of the second member, the convex portion is provided to the fastening member that is fixed to the vehicle body).

The joint structure, in which the electrodeposition coating film and the convex portion mesh with each other without the base material contacting the convex portion as in any of the first to fourth embodiments, is applied to the fastened portion, which is applied with the large shearing force, between the rear side frame 21 of the vehicle body and the suspension crossmember 20a on the suspension system 20 side illustrated in FIG. 10. In this way, it is possible to increase the fastening force without increasing the shaft diameter or the outer diameter of each of the bolt and the nut. In addition, it is possible to reduce the weight of the fastening structure between the vehicle body and the suspension.

In addition, in the suspension system illustrated in FIG. 10, portions that are fastened to a knuckle (not illustrated) for supporting an axle, that is, a tip 23a of an upper arm 23, a tip 24a of the lower arm 24, a tip 25a of a torsion beam 25, and the like are also the portions applied with the large shearing force. Thus, it is preferred to apply the joint structure, in which the electrodeposition coating film and the convex portion mesh with each other without the base material contacting the convex portion as in any of the first to fourth embodiments.

Figure 11:
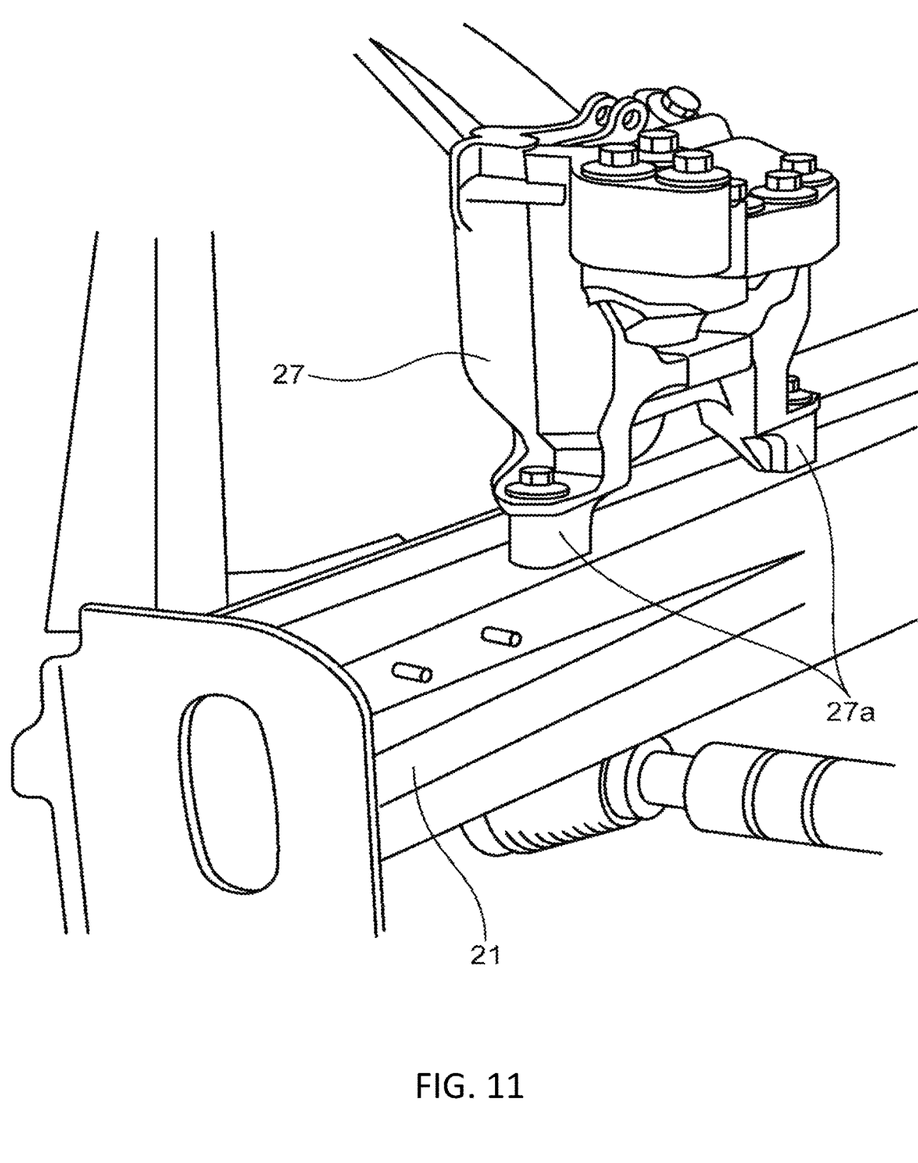
FIG. 11 is a perspective explanatory view illustrating a vehicle engine mount and the surroundings thereof as further another application example of the joint structure in the present disclosure.

Furthermore, the joint structure according to each of the first to fourth embodiments is applied to a fastened portion of an engine mount in the vehicle. For example, as illustrated in FIG. 11, a fastened portion between the rear side frame 21 of the vehicle and a boss 27a of an engine mount 27 is also the portion applied with the large shearing force. Thus, it is preferred to apply the joint structure in which the electrodeposition coating film and the convex portion mesh with each other without the base material contacting the convex portion as in any of the first to fourth embodiments.

Furthermore, the joint structure can also be applied to fasten a relatively large-sized battery unit, which is mounted to the vehicle such as an electric vehicle or a hybrid vehicle, and the vehicle body. The joint structure, in which the electrodeposition coating film and the convex portion mesh with each other without the base material and the convex portion contacting each other as in any of the first to fourth embodiments, may be applied to the fastening structure, as the portion applied with the large shearing force, between the battery unit, which is mounted to the vehicle, and the vehicle body. That is, one of the battery unit and the vehicle body may include the first member having the electrodeposition coating film in any of the first to fourth embodiments, and the other may include the second member having the convex portion in the respective embodiment (or, instead of the second member, the convex portion is provided to the fastening member that is fixed to a different position from the first member and the second member in the vehicle body). In this way, it is possible to increase the fastening force without increasing the shaft diameter or the outer diameter of each of the bolt and the nut. In addition, it is possible to reduce the weight of the fastening structure between the battery unit and the vehicle body.

In summary, the joint structures according to the first to fourth embodiments can be applied to various portions such as portions applied with the large shearing force in the fastened portion between the components in the vehicle, and can be applied to the following portions.

Application of Disclosed Structure to Portions of a Vehicle
a) Entire suspension area (fastening between the suspension and the body, fastening between the suspension and the suspension crossmember, and fastening between the suspension and a wheel. The suspension includes an arm, a damper, a hub carrier, a torsion beam, and the like.
b) Transmission mount (fastening between a transmission and the body)
c) Differential mount (fastening between a differential gear and the body)
d) Engine mount (fastening between the engine and the body or fastening between the engine and the suspension crossmember)
e) Tower bar (fastening between a suspension housing and a dash cowl, fastening between the suspension housing and an upper shroud, and the like)
f) Cowl member (fastening between a cowl member and a cowl grille)
g) High-voltage module (fastening between the battery unit and the body)
h) Trailer hitch
i) Bumper reinforcement
j) Tunnel member
k) Hinge or latch of a lid (a door, a trunk lid, and the like)
l) Tank

What is claimed is:

1. A joint structure comprising:
a first member in which an anti-rust coating film is formed on a surface of a metallic base material;
a second member that contacts the first member; and
a fastening member that fastens the first member and the second member, wherein
plural convex portions, a height of each of which is less than a thickness of the anti-rust coating film, are formed in a part of a surface of the second member that contacts the first member,
the first member and the second member are fastened by the fastening member such that the anti-rust coating film of the first member and the plural convex portions mesh with each other without the base material of the first member contacting the plural convex portions, and
each of the first and second members has a through hole, the fastening member has a shaft which passes through the through hole of the first member and the through hole of the second member, and the plural convex portions are only formed in the surface of the second member around the through hole of the second member.

2. The joint structure according to claim 1, wherein each of the plural convex portions has a sharply pointed tip.

3. The joint structure according to claim 2, wherein the second member is a plate material that overlaps the first member and is fastened.

4. The joint structure according to claim 2, wherein the second member is a spacer, and
the spacer is interposed between a third member and the first member, and is fastened together with the first member and the third member, the third member differing from the first member and the second member.

5. The joint structure according to claim 4, wherein the joint structure is applied to fasten a suspension crossmember and a suspension in a vehicle, and
one of the suspension crossmember and the suspension includes the first member, and the other thereof includes the second member.

6. The joint structure according to claim 2, wherein the second member is a washer that is interposed between the first member and the fastening member.

7. The joint structure according to claim 2, wherein the joint structure is applied to fasten a suspension crossmember and a suspension in a vehicle, and
one of the suspension crossmember and the suspension includes the first member, and the other thereof includes the second member.

8. The joint structure according to claim 2, wherein the joint structure is applied to fasten a vehicle body and a suspension in a vehicle, and
one of the vehicle body and the suspension includes the first member, and the other thereof includes the second member.

9. The joint structure according to claim 2, wherein the joint structure is applied to fasten a battery unit mounted to a vehicle and a vehicle body, and
one of the battery unit and the vehicle body includes the first member, and the other thereof includes the second member.

10. The joint structure according to claim 1, wherein the second member is a plate material that overlaps the first member and is fastened.

11. The joint structure according to claim 1, wherein the second member is a spacer, and
the spacer is interposed between a third member and the first member, and is fastened together with the first member and the third member, the third member differing from the first member and the second member.

12. The joint structure according to claim 1, wherein the second member is a washer that is interposed between the first member and the fastening member.

13. The joint structure according to claim 1, wherein the joint structure is applied to fasten a suspension crossmember and a suspension in a vehicle, and
one of the suspension crossmember and the suspension includes the first member, and the other thereof includes the second member.

14. The joint structure according to claim 1, wherein the joint structure is applied to fasten a vehicle body and a suspension in a vehicle, and
one of the vehicle body and the suspension includes the first member, and the other thereof includes the second member.

15. The joint structure according to claim 1, wherein the joint structure is applied to fasten a battery unit mounted to a vehicle and a vehicle body, and
one of the battery unit and the vehicle body includes the first member, and the other thereof includes the second member.

16. A joint structure comprising:
a first member in which an anti-rust coating film is formed on a surface of a metallic base material;
a second member that overlaps the first member; and
a fastening member that fastens the first member and the second member, wherein
the fastening member includes a stationary portion that does not rotate during fastening and that includes a surface contacting the anti-rust coating film of the first member,
plural convex portions, a height of each of which is less than a thickness of the anti-rust coating film, are formed in a part of a surface of the stationary portion,
the first member and the second member are fastened by the fastening member such that the anti-rust coating film of the first member and the plural convex portions mesh with each other without the base material of the first member contacting the plural convex portions, and
the fastening member further includes a shaft extending from the surface of the stationary portion and passing through a through hole in the first member, and the plural convex portions are formed in the surface of the stationary portion only in a range around the shaft.

17. A method for manufacturing a joint structure that joins a first member having a first through hole and a second member having a second through hole, the method comprising:
a preparation step for preparing the first member in which an anti-rust coating film is formed on a surface of a metallic base material, the second member having a convex portion having a height less than a thickness of the anti-rust coating film in only a part of a surface around the second through hole contacting the first member, and a fastening member having a shaft that fastens the first member and the second member by passing through the first and second through holes;
a positioning step for positioning the first member and the second member such that the convex portion opposes the anti-rust coating film; and
a fastening step for fastening the first member and the second member by the fastening member with an axial force of the fastening member for meshing with the anti-rust coating film without the convex portion contacting the base material of the first member.

* * * * *